B. O. RHODES.
UNIVERSAL JOINT.
APPLICATION FILED FEB. 17, 1916.
1,204,190.
Patented Nov. 7, 1916.
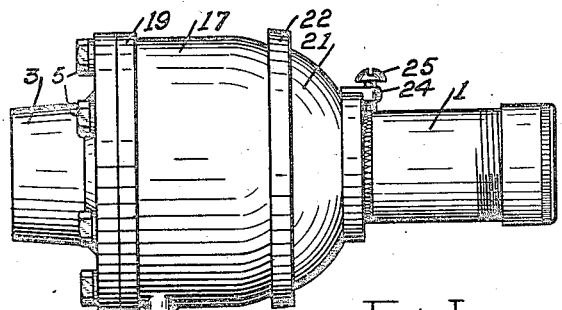
Fig. I.
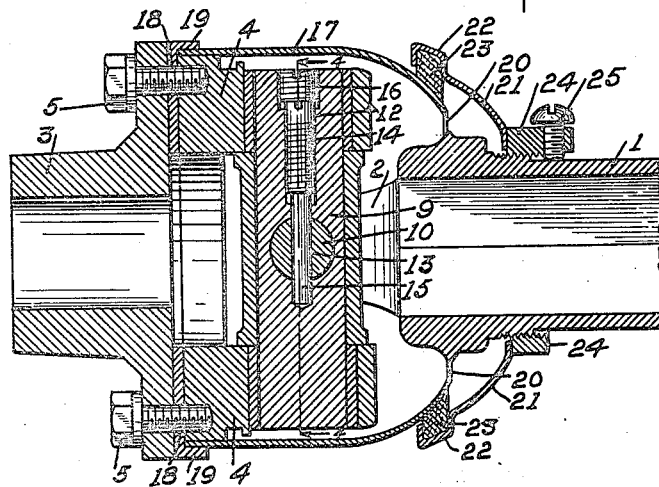
Fig. II.
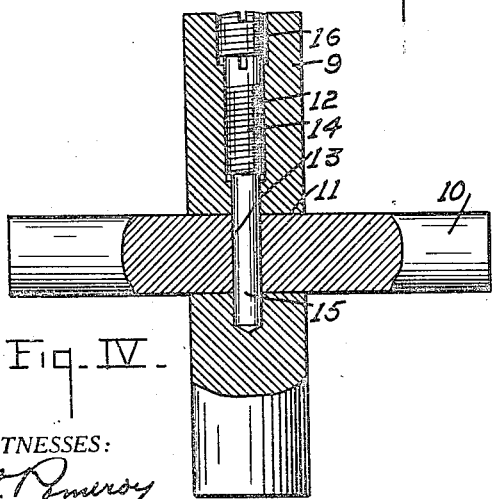
Fig. IV.
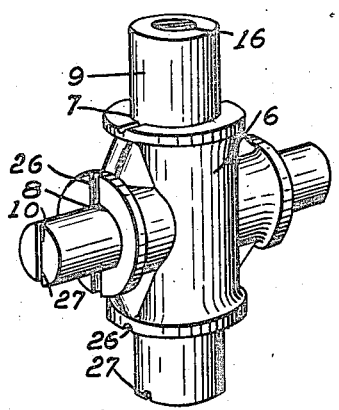
Fig. III.
WITNESSES:
P. W. Pomeroy
Luther Blake
INVENTOR.
Bert O. Rhodes
BY Chappell & Earl
ATTORNEYS.

UNITED STATES PATENT OFFICE.

BERT O. RHODES, OF KALAMAZOO, MICHIGAN, ASSIGNOR TO ACME UNIVERSAL JOINT COMPANY, OF KALAMAZOO, MICHIGAN.

UNIVERSAL JOINT.

1,204,190.  Specification of Letters Patent.  Patented Nov. 7, 1916.

Application filed February 17, 1916. Serial No. 78,920.

*To all whom it may concern:*

Be it known that I, BERT O. RHODES, a citizen of the United States, residing at the city and county of Kalamazoo, State of Michigan, have invented certain new and useful Improvements in Universal Joints, of which the following is a specification.

This invention relates to improvements in universal joints.

The main object of my invention is to provide an improved universal joint of the journal pin type which is simple in its parts and easily assembled and disassembled and one which is very secure.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is a side view of a structure embodying the features of my invention. Fig. II is a longitudinal central section. Fig. III is a perspective view of the journal member with the journal pins arranged therein. Fig. IV is a detail view, partially in section, on a line corresponding to line 4—4 of Fig. II, showing the arrangement of the journal pins and their locking means.

In the drawing similar reference characters refer to similar parts throughout the several views, and the sectional views are taken looking in the direction of the little arrows at the ends of the section lines.

Referring to the drawing, the joint member 1 is provided with forks 2 having journal pin bearing openings. The shaft member 3 is formed in sections, it being provided with a fork member 4, the arms of which are provided with journal pin openings. The fork member 4 is secured to the shank member by means of the screws 5.

The journal member 6 is provided with journal pin openings 7 and 8 disposed at right angles to each other, the diameter of the opening 7 being substantially greater than that of the opening 8. Journal pins 9 and 10 are arranged in these openings, the larger journal pin 9 being provided with a transverse hole 11 registering with the hole 8 of the journal block or member 6. The pin 9 is arranged in the hole 7 with its hole 11 registering with the hole 8. The smaller pin 10 is then inserted in the journal member hole 8 through the journal pin 9 and constitutes a locking member therefor. The larger journal pin 9 is provided with a stepped longitudinal bore 12, while the smaller journal pin has a transverse hole 13 registering with this bore 12. The locking pin 14 is threaded into this bore 12 with its reduced end 15 extending through the smaller pin 10 constituting a lock therefor. The locking plug 16 is threaded into the bore 12 to engage the end of the pin 14, effectively locking it. In the structure illustrated, the joint is incased, the casing member 17 being sleeved upon the section 4 of the joint member 2.

A ring 18 having a flange 19 at its outer edge adapted to receive the inner end of the casing is clamped between the shaft section 4 and its shank portion, see Fig. II. The casing is open at 20 to permit the swinging of the shaft member 1. The casing cap member 21 is provided with a gasket or packing seat 22 for the packing ring 23 and is adjustably retained upon the joint member 1 to swing therewith by means of the nut 24 and set screw 25.

To assist in alining the holes of the pins with the holes of the journal member 6 the journal member 6 is provided with gaging notches 26, while the pins are provided with gaging notches 27. When these notches are brought into alinement the holes of the journal pins are in proper position.

My improved joint is simple in its parts and has the further advantage of being easily assembled and disassembled and when assembled is very secure.

Having thus described my invention, what I claim as new and desire to secure by Letters Patent, is:

1. The combination of shaft members provided with journal pin bearing openings, a journal member provided with journal pin openings disposed at right angles to each other, the diameter of one opening exceeding that of the other, journal pins disposed in said journal pin openings, the larger pin being provided with a transverse hole registering with the smaller pin opening of said journal member, said smaller pin being disposed therethrough, said larger pin having a stepped longitudinal bore extending from one end through its said transverse journal pin hole, the smaller pin being provided with a transverse hole registering with said bore, a locking pin threaded into said bore to project through the hole in said smaller pin, and a locking plug threaded into said bore to engage the end of said locking pin and constituting a locking means therefor.

2. The combination of shaft members provided with journal pin bearing openings, a journal member provided with journal pin openings disposed at right angles to each other, the diameter of one opening exceeding that of the other, journal pins disposed in said journal pin openings, the larger pin being provided with a transverse hole registering with the smaller pin opening of said journal member, said smaller pin being disposed therethrough, said larger pin having a longitudinal bore, the smaller pin being provided with a transverse locking pin hole registering with said bore, a locking pin threaded into said bore to engage said locking pin hole in said smaller pin, and a locking plug threaded into said bore to lock said locking pin.

In witness whereof, I have hereunto set my hand and seal in the presence of two witnesses.

BERT O. RHODES. [L. S.]

Witnesses:
M. PHINA WOODRUFF,
MARGARET L. GLASGOW.